(12) United States Patent
Saito et al.

(10) Patent No.: US 8,665,343 B2
(45) Date of Patent: Mar. 4, 2014

(54) IMAGE PROCESSING APPARATUS, IMAGE PROCESSING METHOD, PROGRAM, AND RECORDING MEDIUM

(75) Inventors: Mamoru Saito, Tokyo (JP); Hideho Une, Tokyo (JP); Kazuaki Iguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 385 days.

(21) Appl. No.: 12/940,542

(22) Filed: Nov. 5, 2010

(65) Prior Publication Data

US 2011/0129151 A1    Jun. 2, 2011

(30) Foreign Application Priority Data

Nov. 27, 2009  (JP) .................................. 2009-270070

(51) Int. Cl.
*H04N 9/73*    (2006.01)
(52) U.S. Cl.
USPC .................................. 348/223.1; 348/333.12
(58) Field of Classification Search
USPC .......................................... 348/223.1, 333.12
See application file for complete search history.

(56) References Cited

U.S. PATENT DOCUMENTS

| 5,128,769 | A  | * | 7/1992  | Arai et al. ...................... 348/363 |
| 8,199,203 | B2 | * | 6/2012  | Sugimoto ................ 348/208.14 |
| 2006/0250505 | A1 | * | 11/2006 | Gennetten et al. .......... 348/218.1 |
| 2007/0237514 | A1 | * | 10/2007 | Pillman et al. ................. 396/153 |
| 2010/0020191 | A1 | * | 1/2010  | Sugimoto .................. 348/222.1 |
| 2010/0020222 | A1 | * | 1/2010  | Jones et al. ............. 348/333.02 |
| 2010/0026836 | A1 | * | 2/2010  | Sugimoto .................. 348/223.1 |
| 2012/0098989 | A1 | * | 4/2012  | Sugawara .................. 348/222.1 |

FOREIGN PATENT DOCUMENTS

JP    2002-281373    9/2002

\* cited by examiner

*Primary Examiner* — Phuoc Nguyen
(74) *Attorney, Agent, or Firm* — Oblon, Spivak, McClelland, Maier & Neustadt, L.L.P.

(57) ABSTRACT

An image processing apparatus including: a scene recognition section recognizing a scene captured by an image; an assigning section selecting a change-target parameter being an adjustment parameter whose parameter value is to be changed from a plurality of adjustment parameters adjusting the image in response to the scene of the image, and assigning the parameter to a specific operation section being a specific operation section out of user-operable operation sections; and a parameter setting section setting a parameter value of the change-target parameter assigned to the specific operation section in response to operation of the specific operation section by a user.

20 Claims, 8 Drawing Sheets

OPERATION BUTTON

OPERATION RING

FIG. 8

| ADJUSTMENT PARAMETER / SCENE | EXPOSURE | WHITE BALANCE | GRAYSCALE (TONE CURVE) | COLOR |
|---|---|---|---|---|
| EVENING GLOW | ○ | ○ | ○ | × |
| BACKLIGHT | ○ | × | ○ | × |
| BLUE SKY | ○ | × | ○ | ○ |
| SCENERY | ○ | × | × | ○ |
| COLORFUL | ○ | × | ○ | ○ |

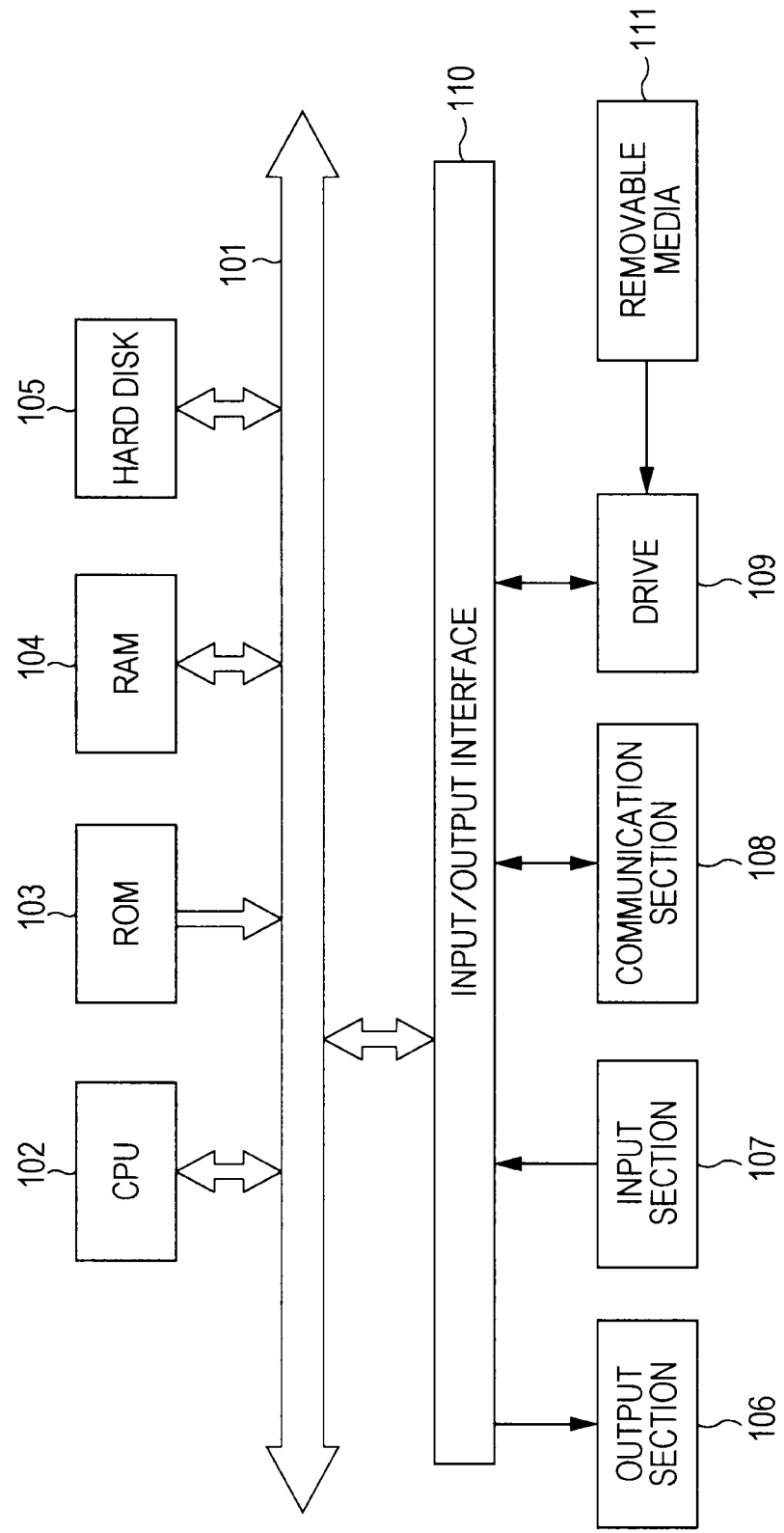

IMAGE PROCESSING APPARATUS, IMAGE PROCESSING METHOD, PROGRAM, AND RECORDING MEDIUM

BACKGROUND OF THE INVENTION

1. Field of the Invention

The present invention relates to an image processing apparatus, image processing method, program, and recording medium. In particular, the present invention relates to an image processing apparatus, image processing method, program, and recording medium which enables a user to suitably select a change-target parameter, which is an adjustment parameter whose parameter value is to be changed from adjustment parameters adjusting white balance, brightness, etc., of an image, for example, and to set a parameter value of the change-target parameter.

2. Description of the Related Art

For example, in a digital camera, adjustment parameters (including shooting parameters at image shooting time) for adjusting an image on exposure control, white balance correction, etc., are set in accordance with operation by a user on an operation section disposed on the digital camera.

Accordingly, the user is allowed to capture an image to meet the user's taste by operating the operation section of the digital camera in accordance with a scene of an image (image scene) to be captured to set parameter values of the adjustment parameters.

Here, an electronic camera in which F number and shutter speed are set in accordance with operation of a user is described in Japanese Unexamined Patent Application Publication No. 2002-281373.

SUMMARY OF THE INVENTION

As described above, in a related-art digital camera, the user is allowed to set various kinds of adjustment parameters to predetermined parameter values by operating the operation section of the digital camera.

However, it is necessary to have a certain level of experience in order to suitably select change-target parameters, which are adjustment parameters whose parameter values are to be changed, among a plurality of adjustment parameters in accordance with a scene of an image to be captured. Thus, it is difficult for a novice user to make selections.

Also, selection operation of the change-target parameters itself is often troublesome operation. Thus, in particular, this partly causes a novice user to prevent from using the camera.

The present invention has been made in view of these circumstances. It is desirable to allow the user to suitably select change-target parameters, and to set the change-target parameters to parameter values.

According to an embodiment of the present invention, there is provided an image processing apparatus or a program for causing a computer to perform functions or a recording medium recording the program for causing a computer to perform functions including: a scene recognition means for recognizing a scene captured by an image; an assigning means for selecting a change-target parameter being an adjustment parameter whose parameter value is to be changed from a plurality of adjustment parameters adjusting the image, and assigning the parameter to a specific operation section being a specific operation section out of user-operable operation sections in response to the scene of the image; and a parameter setting means for setting a parameter value of the change-target parameter assigned to the specific operation section in response to operation of the specific operation section by a user.

According to another embodiment of the present invention, there is provided a method of processing an image, including the steps of: an image processing apparatus recognizing a scene captured by an image; selecting a change-target parameter being an adjustment parameter whose parameter value is to be changed from a plurality of adjustment parameters adjusting the image, and assigning the parameter to a specific operation section being a specific operation section out of user-operable sections in response to the scene of the image; and setting a parameter value of the change-target parameter assigned to the specific operation section in response to operation of the specific operation section by a user.

In an embodiment as described above, a scene captured by an image is recognized, a change-target parameter being an adjustment parameter whose parameter value is to be changed is selected from a plurality of adjustment parameters adjusting the image in response to the scene of the image, the parameter is assigned to a specific operation section being a specific operation section out of user-operable operation sections, and a parameter value of the change-target parameter assigned to the specific operation section is set in response to operation of the specific operation section by a user.

In this regard, the image processing apparatus may be an independent apparatus, or may be an internal block included in one apparatus.

Also, it is possible to provide the program by transmitting through a transmission medium, or by being recorded on a recording medium By an embodiment of the present invention, it is possible to suitably select a change-target parameter being an adjustment parameter whose parameter value is to be changed from adjustment parameters adjusting an image, and to set a parameter value of the change-target parameter.

BRIEF DESCRIPTION OF THE DRAWINGS

FIG. 8 is a diagram illustrating an example of a change-target parameter table stored in the memory;

FIG. 10 is a block diagram illustrating an example of a configuration of a computer to which an embodiment of the present invention is applied.

DESCRIPTION OF THE PREFERRED EMBODIMENTS

Example of configuration of imaging apparatus to which an embodiment of the present invention is applied.

Figure 1:
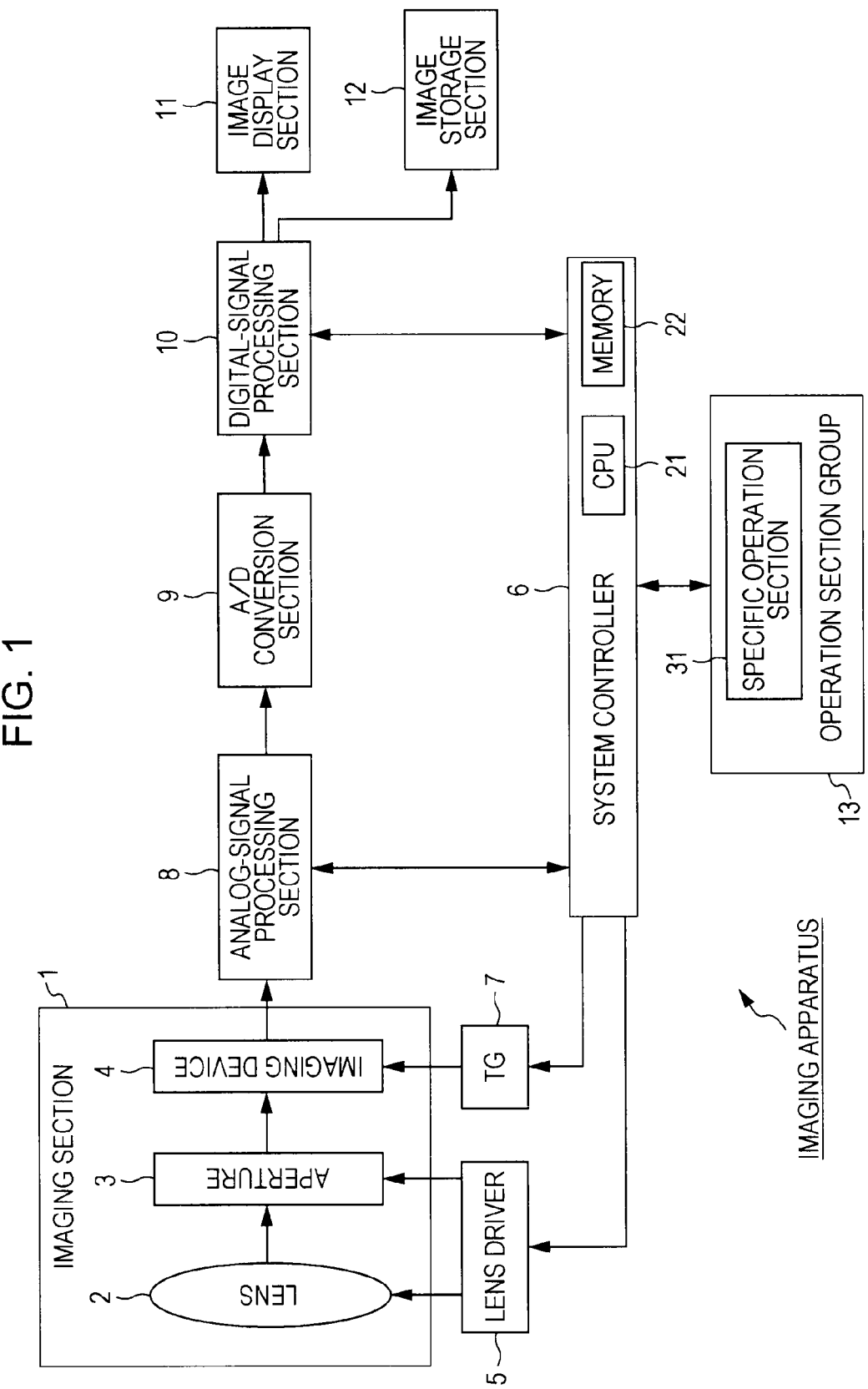
FIG. 1 is a block diagram illustrating an example of a configuration of an imaging apparatus to which an embodiment of the present invention is applied.

FIG. 1 is a block diagram illustrating an example of a configuration of an imaging apparatus to which an embodiment of the present invention is applied.

The imaging apparatus in FIG. 1 is, for example, a digital camera capable of capturing a still image, or a moving image, or both a still image and a moving image. The imaging apparatus includes an imaging section 1, a lens driver 5, a system controller 6, a TG (timing generator) 7, an analog-signal processing section 8, an A/D (Analog/Digital) conversion section 9, a digital-signal processing section 10, an image display section 11, an image storage section 12, and an operation section group 13.

The imaging section 1 includes a lens 2, an aperture 3, and an imaging device 4, and captures an image.

That is to say, the lens 2 is driven by the lens driver 5, and incident light on the lens 2 is condensed on an imaging surface (light-receiving surface) of the imaging device 4 through the aperture 3.

The aperture 3 is driven by the lens driver 5, and adjusts the amount of light condensed on the imaging device 4 by the lens 2.

The imaging device 4 is a solid-state imaging device, such as a CCD (Charged Coupled Device), a CMOS (Complementary Metal Oxide Semiconductor), etc. Light condensed by the lens 2 irradiated on an imaging surface of the imaging device 4 through the aperture 3 to form an optical image.

The imaging device 4 is driven in synchronism with a timing signal from the TG 7, and an analog imaging signal, which is an imaging result of an optical image formed on the imaging surface, is output to the analog-signal processing section 8.

That is to say, the imaging device 4 is a device in which a plurality of pixels having a photodiode (photo gate), a transfer gate (shutter transistor), a switching transistor (address transistor), an amplification transistor, and a reset transistor (reset gate), etc., are arranged in a matrix state on a semiconductor substrate. Also, a vertical scanning circuit, a horizontal scanning circuit, and an image-signal output circuit, which drive the plurality of pixels, are formed on the semiconductor substrate. Each of the pixels performs photoelectric conversion, and an imaging signal as a result of the photoelectric conversion is output in sequence in order of raster scanning.

Each pixel of the imaging device 4 is provided with a color filter of a complementary color system or a primary color system. Thereby, the imaging device 4 outputs an imaging signal of a color signal (color) by complementary colors or primary colors.

The lens driver 5 drives the lens 2 and the aperture 3 under the control of the system controller 6. Thereby, a magnification, a focus, and an aperture are adjusted.

The system controller 6 includes a CPU 21 and a memory 22, and controls blocks included in the imaging apparatus, such as the lens driver 5, the TG 7, the analog-signal processing section 8, the digital-signal processing section 10, etc., in accordance with operation of the operation section group 13 (an operation signal supplied from the operation section group 13), etc.

That is to say, in the system controller 6, the CPU 21 executes programs in the memory 22 to perform various kinds of processing. The memory 22 stores the programs executed by the CPU 21 and necessary data for the operation of the CPU 21.

The TG 7 supplies various kinds of timing signals to the imaging device 4 under the control of the system controller 6. By the timing signal supplied from the TG 7 to the imaging device 4, for example, a speed of an electronic shutter in the imaging device 4 is set to a predetermined speed.

The analog-signal processing section 8 performs various kinds of analog signal processing on the imaging signal from the imaging device 4 under the control of the system controller 6.

That is to say, the analog-signal processing section 8 performs correlated double sampling on the imaging signal from the imaging device 4, further corrects the signal level by a predetermined gain by automatic gain control, and outputs the signal to the A/D conversion section 9.

The A/D conversion section 9 performs A/D conversion on the imaging signal from the analog-signal processing section 8. Thereby, the A/D conversion section 9 converts the analog imaging signal into an image-data digital signal, and outputs the signal to the digital-signal processing section 10.

The digital-signal processing section 10 includes, for example a DSP (Digital Signal Processor), etc., and performs various kinds of digital signal processing on the image data from the A/D conversion section 9 under the control of the system controller 6.

That is to say, the digital-signal processing section 10 performs digital signal processing, such as white balance adjustment, grayscale (tone curve) control, color adjustment, etc., on the image data from the A/D conversion section 9, converts the data into, for example a video signal of the NTSC (National Television System Committee) system, having a field frequency of 60 Hz, and outputs the signal to the image display section 11 and the image storage section 12.

The image display section 11 includes a touch panel formed integrally with a display device, such as an LCD (Liquid Crystal Display), etc., for example, and displays an image corresponding to a video signal from the digital-signal processing section 10, etc.

The image storage section 12 drives a recording medium, such as an optical disc, a magnetic disk, a memory card, etc., for example, and records the video signal from the digital-signal processing section 10 on a recording medium. Also, the image storage section 12 plays back the video signal from a recording medium.

The operation section group 13 includes a plurality of operation sections that can be operated by a user, and supplies an operation signal corresponding to each operation section to the system controller 6.

In this regard, each operation section included in the operation section group 13 may be a physical operation section, or may be an operation section displayed on the touch panel included in the image display section 11.

A predetermined function, such as a function of a shutter button (release switch), etc., is assigned to each operation section included in the operation section group 13 in advance.

Also, one specific operation section among a plurality of operation sections included in the operation section group 13 functions as a specific operation section 31.

The specific operation section 31 is operated when the user sets (changes) change-target parameters (whose parameter values), which are predetermined one or more adjustment parameters among adjustment parameters adjusting an image (whose image quality) in a semi-manual setting mode described later.

That is to say, functions of setting various kinds of adjustment parameters, such as an exposure-control adjustment parameter related to, for example, a degree of opening (aperture) of the aperture 3, an electronic shutter speed of the imaging device 4, and a gain in automatic gain control of the analog-signal processing section 8, a white-balance adjustment parameter of the digital-signal processing section 10, a grayscale-control adjustment parameter of the digital-signal processing section 10, and a color adjustment parameter of the digital-signal processing section 10, etc., are assigned to each operation section included in the operation section group 13 as default functions. However, a function of setting change-target parameters, which are one or more adjustment parameters whose parameter values are to be changed and selected from various kinds of adjustment parameters as described later, is assigned to the specific operation section 31.

In the imaging apparatus configured as described above, the imaging signal obtained as a result of shooting by the imaging section 1 is output to the analog-signal processing section 8.

That is to say, in the imaging section 1, incident light on the lens 2 is condensed on the imaging surface of the imaging device 4 through the aperture 3. Thereby, an optical image is formed on the imaging surface of the imaging device 4.

In the imaging device 4, an imaging signal corresponding to the optical image formed on the imaging surface is output to the analog-signal processing section 8.

The analog-signal processing section 8 performs various kinds of analog signal processing on the imaging signal from the imaging device 4, and outputs the signal to the A/D conversion section 9.

The A/D conversion section 9 performs A/D conversion on the imaging signal from the analog-signal processing section 8, and outputs image data of a digital signal obtained as a result to the digital-signal processing section 10.

The digital-signal processing section 10 performs various kinds of digital signal processing on the image data from the A/D conversion section 9.

Further, the digital-signal processing section 10 converts the image data obtained as a result of the digital signal processing into a video signal of the NTSC system, and outputs the signal to the image display section 11 and the image storage section 12.

The image display section 11 displays an image corresponding to the video signal from the digital-signal processing section 10. The image storage section 12 records the video signal from the digital-signal processing section 10 on a recording medium as necessary.

Here, the imaging apparatus in FIG. 1 is provided with at least a full-manual setting mode and a semi-manual setting mode as parameter setting modes for setting various kinds of adjustment parameters (whose parameter values). In the full-manual setting mode, setting of all the adjustment parameters is carried out by user's operation on each operation section of the operation section group 13. In the semi-manual setting mode, setting of the change-target parameters among the adjustment parameters is carried out by user's operation on the specific operation section 31, and setting of the remaining adjustment parameters is automatically conducted by the system controller 6.

If the parameter setting mode is the full-manual setting mode, the system controller 6 sets (stores) the parameter values of all the adjustment parameters in response to the user's operation on each operation section of the operation section group 13, and controls the lens driver 5, the TG 7, the analog-signal processing section 8, and the digital-signal processing section 10 in accordance with the adjustment parameters after the settings.

As a result, the imaging apparatus performs the exposure control, the white balance adjustment, the grayscale control, the color adjustment, etc., in accordance with the various kinds of adjustment parameters set in response to the operation on the operation section group 13.

On the other hand, if the parameter setting mode is the semi-manual setting mode, the system controller 6 sets the change-target parameter among the adjustment parameters in response to the operation of the operation section 31 by the user. Also, the system controller 6 automatically sets the remaining adjustment parameters, and controls the lens driver 5, the TG 7, the analog-signal processing section 8, and the digital-signal processing section 10 in accordance with the adjustment parameters (including the change-target parameters) after the settings.

As a result, in the imaging apparatus, the exposure control, the white balance adjustment, the grayscale control, the color adjustment, etc., are performed in accordance with the change-target parameters set in response to the operation of the specific operation section 31 and the adjustment parameters automatically set by the system controller 6.

Example of Specific Operation Section 31

A description will be given of an example of the specific operation section 31 in FIG. 1 with reference to FIGS. 2 to 6.

Figure 2:
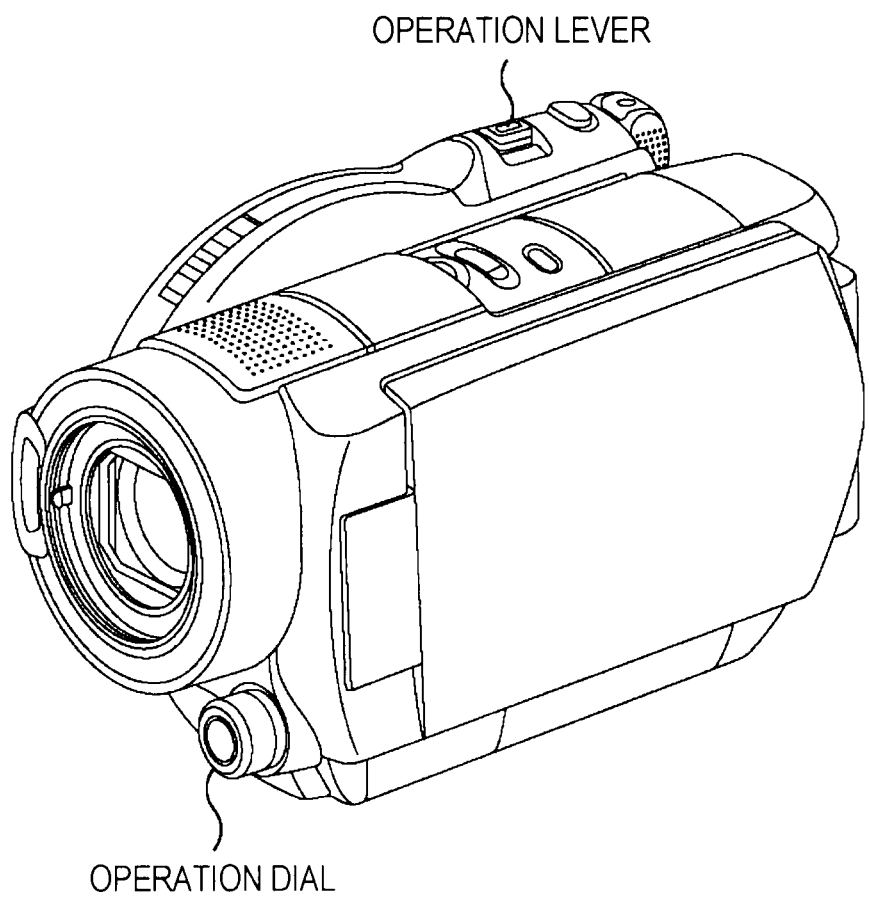
FIG. 2 is a perspective view illustrating an example of a first outer configuration of the imaging apparatus.

FIG. 2 is a perspective view illustrating an example of a first outer configuration of the imaging apparatus in FIG. 1.

As shown in FIG. 2, if the imaging apparatus is provided with an operation lever capable of being moved in one direction and in the opposite direction to that direction, and an operation dial capable of being rotated in a clockwise direction and in a counterclockwise direction, the operation lever and the operation dial can be employed as the specific operation section 31.

Figure 3:
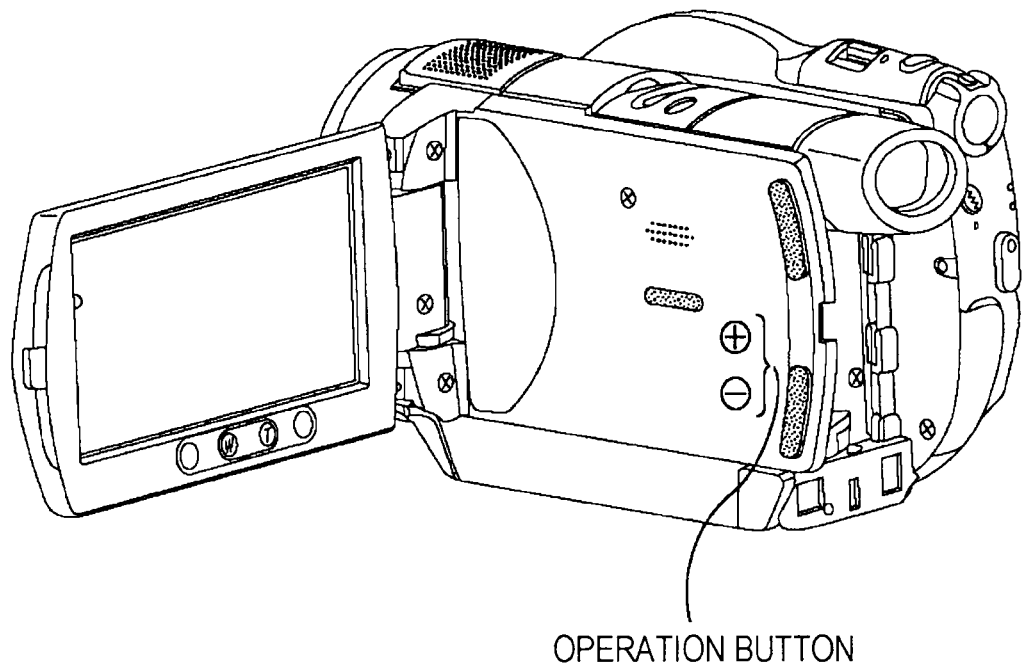
FIG. 3 is a perspective view illustrating an example of a second outer configuration of the imaging apparatus.

FIG. 3 is a perspective view illustrating an example of a second outer configuration of the imaging apparatus in FIG. 1.

As shown in FIG. 3, if the imaging apparatus is provided with an operation button whose operation value can be incremented or decremented, the operation button can be employed as the specific operation section 31.

Figure 4:
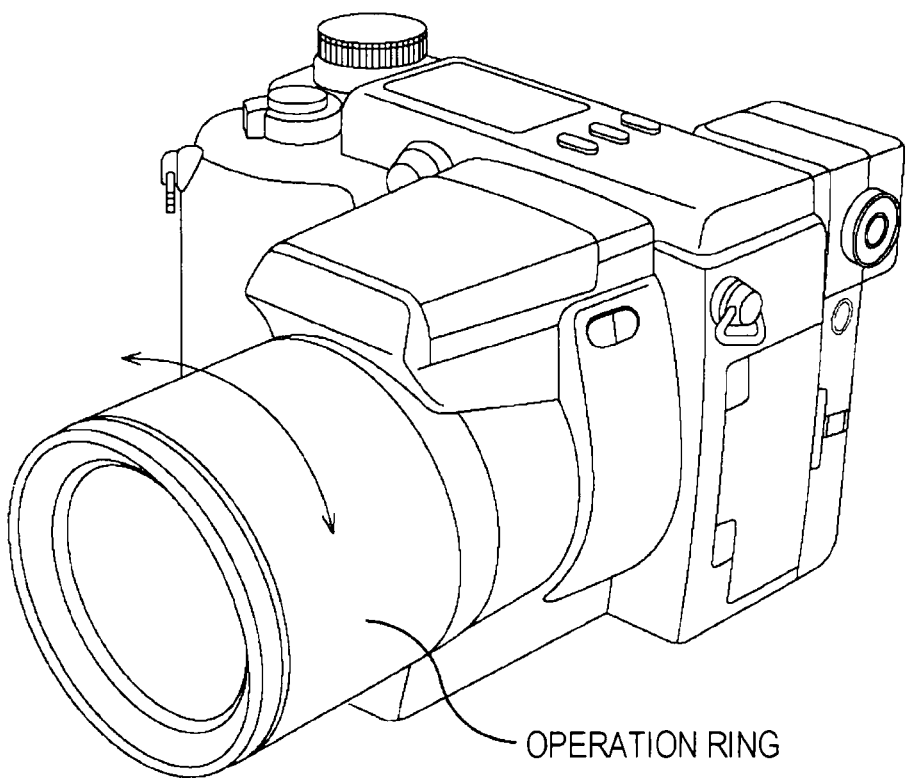
FIG. 4 is a perspective view illustrating an example of a third outer configuration of the imaging apparatus.

FIG. 4 is a perspective view illustrating an example of a third outer configuration of the imaging apparatus in FIG. 1.

As shown in FIG. 4, if the imaging apparatus is provided with an operation ring capable of being rotated in a clockwise direction and in a counterclockwise direction, the operation ring can be employed as the specific operation section 31.

Figure 5:
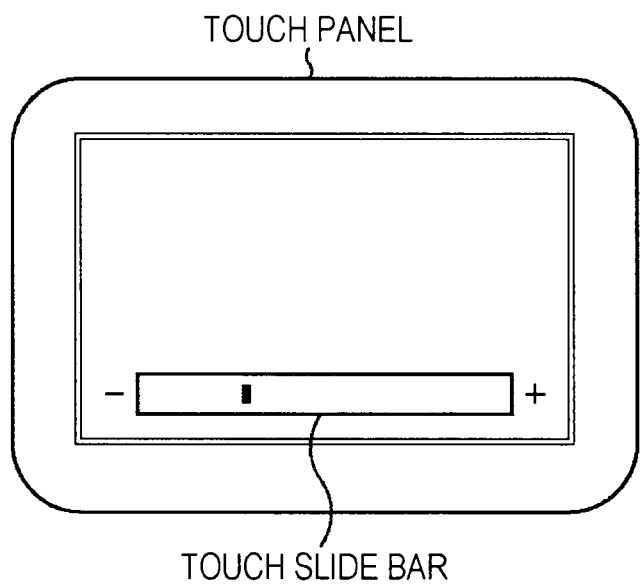
FIG. 5 is a diagram illustrating a first display example of a touch panel included in the image display section.

FIG. 5 is a diagram illustrating a first display example of a touch panel included in the image display section 11 of the imaging apparatus in FIG. 1.

As shown in FIG. 5, if a touch slide bar capable of being operated in a horizontal direction and in a vertical direction is displayed on the touch panel, the touch slide bar can be employed as the specific operation section 31.

Figure 6:
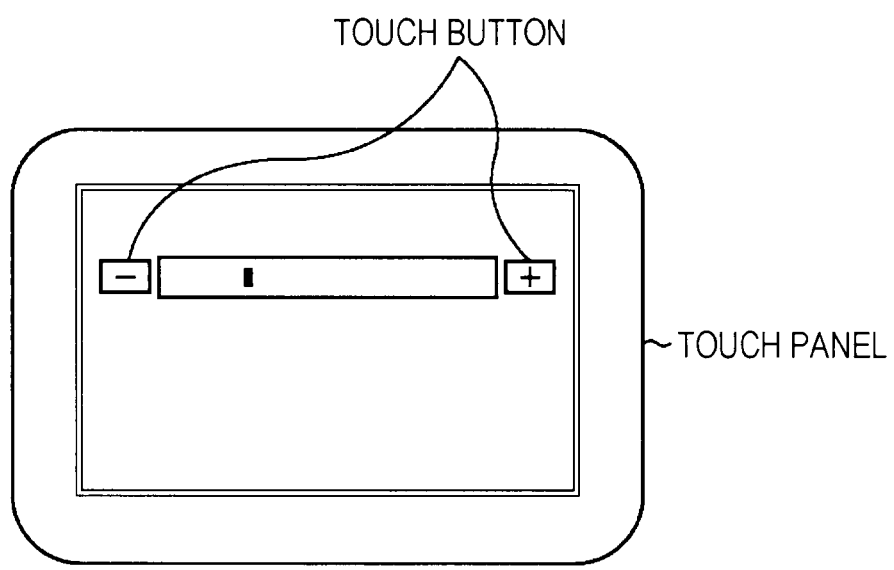
FIG. 6 is a diagram illustrating a second display example of a touch panel included in the image display section.

FIG. 6 is a diagram illustrating a second display example of the touch panel included in the image display section 11 of the imaging apparatus in FIG. 1.

As shown in FIG. 6, if a touch button whose operation value can be incremented or decremented is displayed on the touch panel, the touch button can be employed as the specific operation section 31.

Parameter Setting in Semi-Manual Setting Mode

Figure 7:
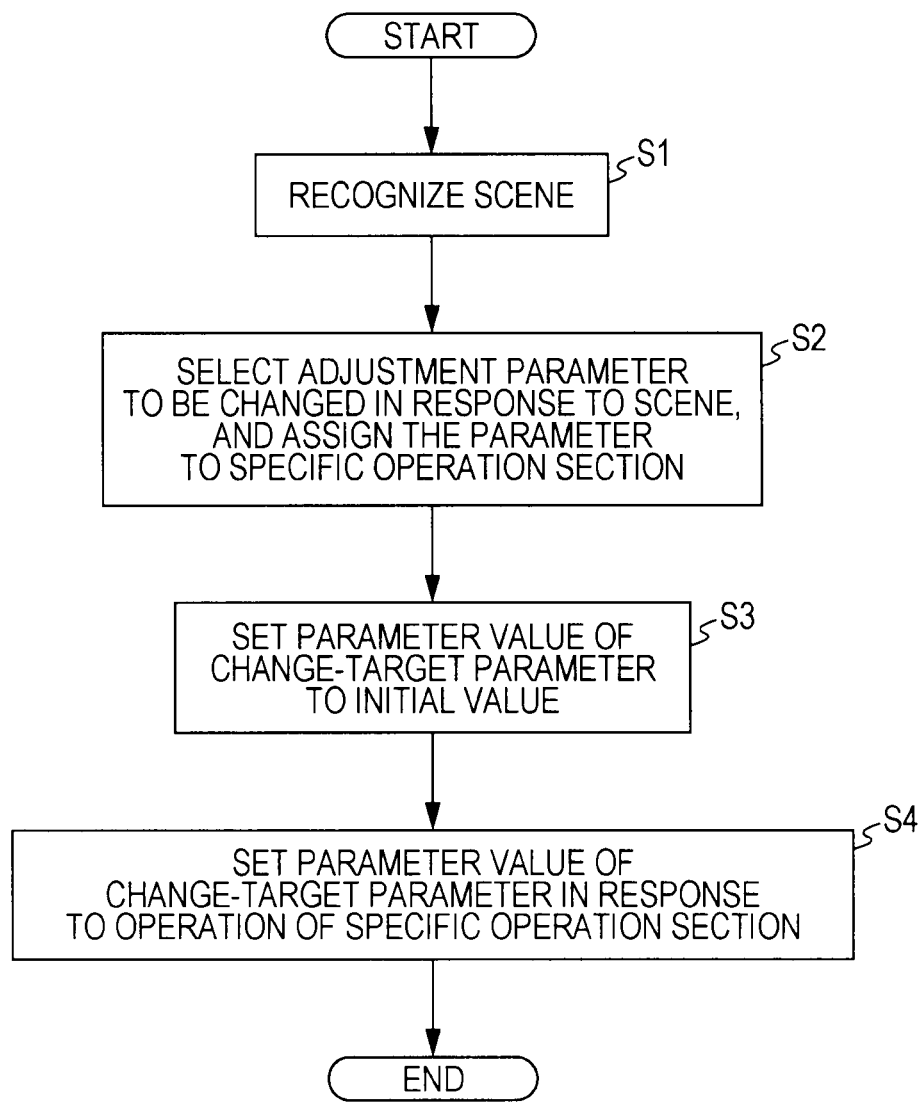
FIG. 7 is a flowchart illustrating adjustment-parameter setting processing performed by the system controller in a semi-manual setting mode.

FIG. 7 is a flowchart illustrating adjustment-parameter setting processing performed by the system controller 6 in FIG. 1 in a semi-manual setting mode.

In step S1, the system controller 6 recognizes a scene of an image captured by the imaging section 1, and the processing proceeds to step S2.

That is to say, the system controller 6 determines the scene (shot scene) of the image captured by the imaging section 1, for example, by a method described in Japanese Unexamined Patent Application Publication No. 2004-235956, or any other methods using brightness and color information, a histogram of pixel values, etc., of the image data to be subjected to the digital signal processing in the digital-signal processing section 10. The system controller 6 recognizes the scene of the image captured by the imaging section 1 in accordance with the determination result.

Here, the imaging apparatus in FIG. 1 is provided with a plurality of (shooting) scenes as scene determination results in advance, for example, "evening glow", which is a scene of an evening glow, "backlight", which is a backlight scene, "blue sky", which is a scene of a building taken against the sky, "scenery", which is a scene including many green plants and the blue sky, "colorful", which is a colorful scene including various flowers, etc. The system controller 6 determines a scene of an image captured by the imaging section 1 from a plurality of scenes (hereinafter also referred to as default scenes) provided in advance.

In this regard, in step S1, it is possible for the user to select a scene of an image to be captured now from a plurality of default scenes, and thus the system controller 6 can recognize the scene of the image being captured by the imaging section 1 in accordance with the selection of the scene by the user.

In step S2, the system controller 6 selects change-target parameters, which are adjustment parameters whose parameter values are to be changed from a plurality of adjustment parameters in response to a recognition result (hereinafter also referred to as a recognition scene) of a scene of the image captured by the imaging section 1.

That is to say, for example, a table (hereinafter also referred to as a change-target parameter table) in which individual default scenes are related to adjustment parameters to be selected as a change-target parameter in response to the default scenes is stored in the memory 22 of the system controller 6 in advance.

The system controller 6 selects the adjustment parameters related to the default scene matching the recognition scene in the change-target parameter table corresponding to the recognition scene as the change-target parameters.

Further, in step S2, the system controller 6 assigns the change-target parameters to a specific operation section 31 (assigns a function of changing parameter values of the change-target parameter to a specific operation section 31), and the processing proceeds to step S3.

In step S3, the system controller 6 sets the parameter values of the change-target parameters to predetermined initial values, and sets the parameter values of the adjustment parameters other than the change-target parameters to predetermined values, respectively, and the processing proceeds to step S4.

Here, the memory 22 of the system controller 6 stores a parameter characteristic indicating a relationship between an operation value of the specific operation section 31 and parameter values of the change-target parameters in association with the default scene for each default scene in advance.

If it is assumed that an operation value whose value is changed in accordance with operation of the specific operation section 31, for example, in a range between −A and +A, the system controller 6 sets the parameter value of the change-target parameter to a predetermined initial value thereof in step S3 using a parameter value in the case where the operation value being a middle point of the range between −A and +A is 0, for example, as a predetermined initial value in a parameter characteristic related to a default scene matching the recognition scene for the change-target parameter. Otherwise, for a predetermined initial value, for example, it is possible to employ current parameter values of the change-target parameters without change.

Also, the memory 22 of the system controller 6 stores a parameter value for the adjustment parameter other than the change-target parameter in association with the default scene for each default scene in advance. For the adjustment parameters other than the change-target parameter, in step S3, the system controller 6 (automatically) sets the parameter value of the adjustment parameter other than the change-target parameter to a predetermined value using the parameter values related to a default scene matching the recognition scene as a predetermined value.

In step S4, if the user has operated the specific operation section 31, the system controller 6 sets (changes) the parameter value of the change-target parameter assigned to the specific operation section 31 in response to the operation.

That is to say, if an operation value of the specific operation section 31 is changed by the user operating the specific operation section 31, the system controller 6 sets the parameter value of the change-target parameter to a parameter value corresponding to the operation value after the change in the parameter characteristic in accordance with the parameter characteristic related to the default scene matching the recognition scene.

Further, the system controller 6 controls the lens driver 5, the TG 7, the analog-signal processing section 8, and the digital-signal processing section 10 in accordance with the parameter values of the adjustment parameters including the change-target parameters.

The imaging apparatus performs adjustment processing adjusting an image, such as the exposure control, the white balance adjustment, the grayscale control, the color adjustment, etc., in accordance with the change-target parameters set in response to the operation of the specific operation section 31 and the adjustment parameters automatically set by the system controller 6, and displays an image obtained as a result of the adjustment processing on the image display section 11.

Accordingly, it is possible for the user to set the parameter values of the change-target parameters allowing the user to obtain an image meeting the user's preference by operating the specific operation section 31 while viewing the image displayed on the image display section 11 and checking the advantages of the adjustment processing, and to capture an image (to record an image on the recording medium by the image storage section 12).

In this regard, operation sections to be included in the specific operation section 31 can be selected in accordance with operation of the user in addition to having been determined in advance. If the operation sections to be the specific operation section 31 can be selected in accordance with the operation of the user, the user is allowed to select operation sections that are easy for the user to operate for the specific operation section 31, and to set parameter values of the change-target parameters by easy operation.

Also, only one operation section or a plurality of operation sections can be disposed as the specific operation section 31.

When a plurality of operation sections, for example, two operation sections are included in the specific operation section 31, a same change-target parameter can be individually assigned to the two operation sections of the specific operation section 31.

In this case, whichever operation section out of the two operation sections is operated as the specific operation section 31, the parameter value of the change-target parameter can be changed in the same manner.

Also, in the case where a plurality of operation sections, for example, two operation sections are included in the specific operation section 31, if a plurality of adjustment parameters are to be the change-target parameters, it is possible to assign a part of the plurality of change-target parameters to one of the two operation sections, and to assign the remaining parameters out of the plurality of change-target parameters to other of the two operation sections in addition to individually assigning the same plurality of change-target parameters to the two operation sections as the specific operation section 31.

In this case, the change-target parameter whose parameter value is to be changed is different depending on whether either of the two operation sections is operated as the specific operation section 31.

Change-Target Parameter Table

FIG. 8 is a diagram illustrating an example of a change-target parameter table stored in the memory 22 of the system controller 6.

As described in FIG. 7, the change-target parameter table is a table in which default scenes are related to adjustment parameters to be selected as the change-target parameters in association with the default scene. In FIG. 8, the above-described five scenes, namely "evening glow", "backlight", "blue sky", "scenery", and "colorful" are defined to be default scenes, and the adjustment parameters to be selected as the change-target parameters are stored for the five (five kinds of) default scene, respectively.

Also, in FIG. 8, it is possible to select one or more adjustment parameters out of the four adjustment parameters, namely the exposure-control adjustment parameters, the white-balance adjustment (white balance correction) parameters, the grayscale-control adjustment parameters, and the color adjustment (color correction) parameters as adjustment parameters to be selected as the change-target parameters.

In this regard, the scenes (default scenes) stored in the change-target parameter table are not limited to the five scenes described above, and the adjustment parameters that can be selected as the change-target parameters are not limited to the four adjustment parameters described above.

Also, in the change-target parameter table, one or more adjustment parameters can be assigned to one default scene as the change-target parameters. In FIG. 8, two or more adjustment parameters are assigned to one default scene as the change-target parameters. In this case, two or more change-target parameters (whose parameter value) related to the default scene are changed (set) at the same time in response to operation of the specific operation section 31.

By the change-target parameter table in FIG. 8, for a "evening glow" scene (default scene), in order to express various evening scenes by changing color temperature, brightness, and contrast, three adjustment parameters, namely the exposure-control adjustment parameter, the white-balance adjustment parameter, and the grayscale-control adjustment parameter are selected as the change-target parameters out of the four adjustment parameters, namely the exposure-control adjustment parameter, the white-balance adjustment parameter, the grayscale-control adjustment parameter, and the color adjustment parameter.

Also, for a "backlight" scene, in order to control to enable shooting a subject, such as a person, a building, etc., in silhouette, or on the contrary, preventing shooting in dark so as to clearly shoot a face, a building, etc., by changing brightness and tone curve, two adjustment parameters, namely the exposure-control adjustment parameter and the grayscale-control adjustment parameter are selected as the change-target parameters out of the four adjustment parameters described above.

For a "blue sky" scene, in order to emphasize a blue sky by changing blue color of the sky, brightness, and tone curve, three adjustment parameters, namely the exposure-control adjustment parameter, the grayscale-control adjustment parameter, and the color adjustment parameter are selected as the change-target parameters out of the four adjustment parameters described above.

For a "scenery" scene, in order to shoot a scenery scene more vividly by changing blue color of the sky, green color of plants, and brightness, two adjustment parameters, namely the exposure-control adjustment parameter and the color adjustment parameter are selected as the change-target parameters out of the four adjustment parameters described above.

For a "colorful" scene, in order to impressively express flowers, etc., by changing color strength, brightness, and contrast, three adjustment parameters, namely the exposure-control adjustment parameter, the grayscale-control adjustment parameter, and the color adjustment parameter are selected as the change-target parameters out of the four adjustment parameters described above.

Parameter Characteristic

Figure 9:
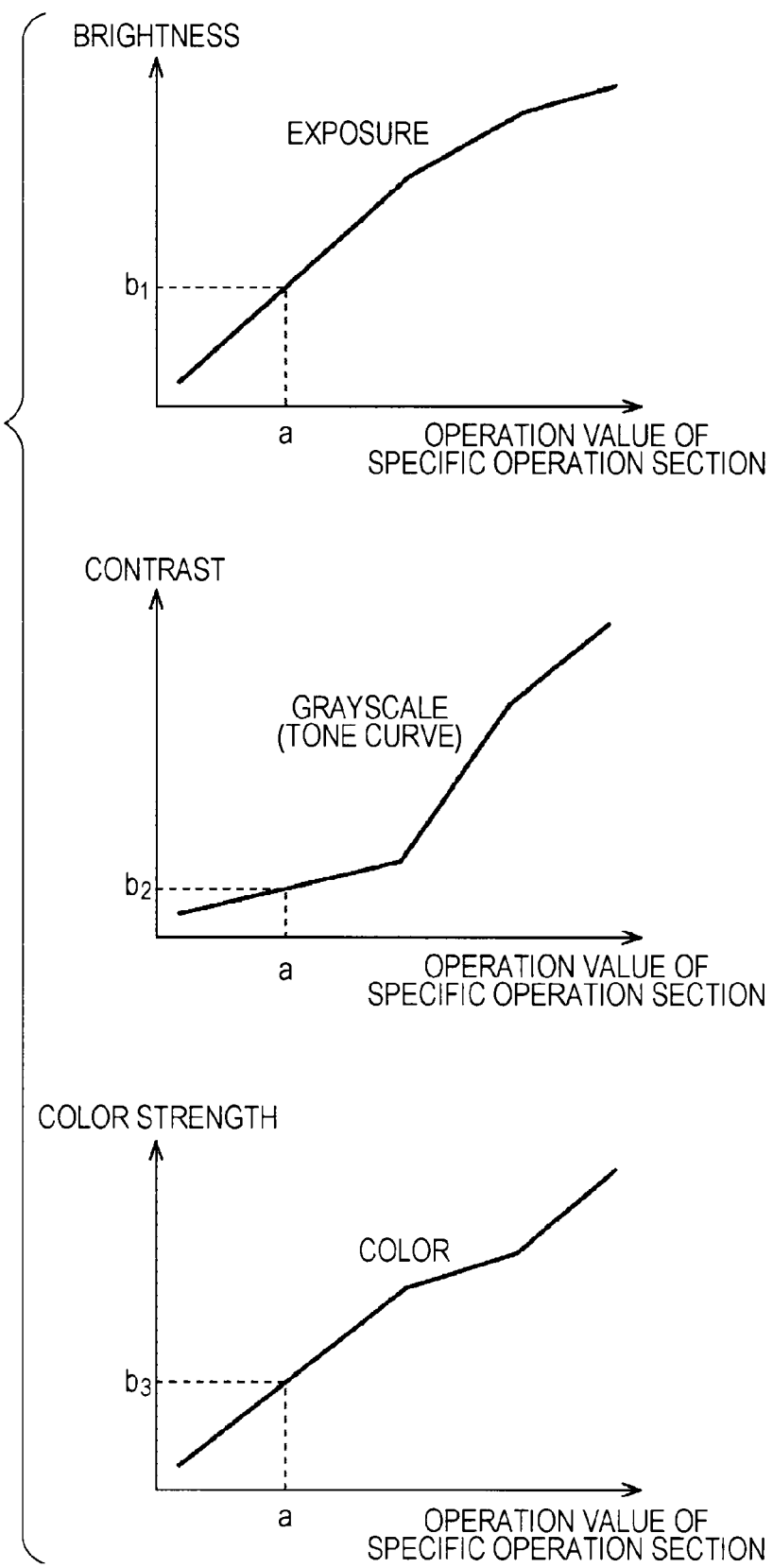
FIG. 9 is a diagram illustrating an example of parameter characteristics stored in the memory 22.

FIG. 9 is a diagram illustrating an example of a parameter characteristic stored in the memory 22 of the system controller 6.

As described in FIG. 7, the parameter characteristic shows a relationship between an operation value of the specific operation section 31 and a parameter value of the change-target parameter.

FIG. 9 illustrates parameter characteristics in graphic form indicating relationships between operation values of the specific operation section 31 and parameter values of the change-target parameters. The parameter characteristics are stored in the memory 22 in a format that is easy to be handled by the CPU 21, such as a numerical code, etc.

As illustrated in FIG. 7, the parameter characteristics are stored in the memory 22 in association with a default scene for each default scene. The system controller 6 sets the parameter values of the change-target parameters in accordance with the parameter characteristics related to the default scene matching the recognition scene.

FIG. 9 illustrates, for example the parameter characteristics related to "blue sky" out of the five default scenes that are stored in the change-target parameter table in FIG. 8, namely "evening glow", "backlight", "blue sky", "scenery", and "colorful".

By the change-target parameter table in FIG. 8, as described above, for a "blue sky" scene, the three adjustment parameters, namely the exposure-control adjustment parameter, the grayscale-control adjustment parameter, and the color adjustment parameter are selected as the change-target parameters.

Accordingly, for the parameter characteristics related to "blue sky", there are individual parameter characteristics for the three adjustment parameters, namely the exposure-control adjustment parameter, the grayscale-control adjustment parameter, and the color adjustment parameter that are selected as the change-target parameters. In accordance with the individual parameter characteristics for the three adjustment parameters, the parameter values of the change-target parameters (which are the three adjustment parameters) are set in response to the operation on the specific operation section 31.

That is to say, if it is assumed that in the individual parameter characteristics of the exposure-control adjustment parameter, the grayscale-control adjustment parameter, and the color-adjustment parameter, the parameter values corresponding to a certain operation value a are expressed as $b1$, $b2$, and $b3$, when the specific operation section 31 is operated and the operation value of the specific operation section 31 is set to a value a, the system controller 6 sets, as the change-target parameters, the parameter value (brightness) of the exposure-control adjustment parameter, the parameter value (contrast) of the grayscale-control adjustment parameter, and the parameter value (color strength) of the color-adjustment parameter to values b1, b2, and b3, respectively.

As described above, the parameter values of the two or more adjustment parameters selected as the change-target parameters in response to the operation of the specific operation section 31 are simultaneously changed (set).

In this regard, the change-target parameter table (FIG. 8) and the parameter characteristics (FIG. 9) are determined by, for example, an expert of a manufacturer of the imaging apparatus in FIG. 1, etc., on the basis of experiences and simulation results, etc.

As described above, the imaging apparatus in FIG. 1 recognizes a scene captured by an image, selects a change-target parameter being an adjustment parameter whose parameter value is to be changed from a plurality of adjustment parameters adjusting the image in response to the scene of the image, assigns the parameter to a specific operation section 31 out of user-operable operation sections, and sets a parameter value of the change-target parameter assigned to the specific operation section 31 in response to operation of the specific operation section 31 by a user. Accordingly, it is not necessary for the user to perform troublesome operation for selecting the change-target parameters.

And the imaging apparatus suitably selects the change-target parameters, and allows the user to set (operate) the parameter values of the change-target parameters to obtain images meeting the user's preference.

Also, the system controller 6 is allowed to select two or more adjustment parameters as the change-target parameters from the plurality of adjustment parameters in response to the image scene (recognition scene), and to assign the parameters to one specific operation section 31, and to simultaneously set parameter values of the two or more change-target parameters assigned to the specific operation section 31 in response to the operation of the specific operation section 31 by the user. Accordingly, it is not necessary for the user to consider the relative advantages and the balance between two or more adjustment parameters, and to repeat operation of selecting the adjustment parameters whose parameter values are to be changed. Thus, it is possible even for a novice user to easily set the parameter values meeting an image scene to be captured and the user's preference.

That is to say, for example, in a related-art digital camera (a digital camera performing operation in a full-manual setting mode of the imaging apparatus in FIG. 1) capable of setting various kinds of adjustment parameters to a predetermined parameter values by the user operating the operation section of the digital camera, such as an electronic camera described in Japanese Unexamined Patent Application Publication No. 2002-281373, it is often necessary for the user to change the parameter values of two or more adjustment parameters in consideration of the relative advantages and the balance of the two or more adjustment parameters. Accordingly, it is difficult for a novice user to set the parameter values that allows the user to obtain an image meeting the user's preference.

Also, even for a certain level of skilled person, in order to set parameter values of two or more adjustment parameters that are necessary for the consideration of the relative advantages and the balance, it is sometimes necessary to perform troublesome repetitive operation in which a certain adjustment parameter is selected to change the parameter value thereof, and then another adjustment parameter is selected to change the parameter value thereof, etc. As a result, it often happens that a shooting chance is lost, and it is difficult to perform setting operation of the parameter values of the adjustment parameters while capturing a moving image.

In contrast, in the semi-manual setting mode of the imaging apparatus in FIG. 1, two or more adjustment parameters are selected as the change-target parameters in response to an image scene from a plurality of adjustment parameters, and are assigned to one of the specific operation sections 31. And parameter values of the two or more change-target parameters assigned to the specific operation section 31 are simultaneously set in response to the operation of the specific operation section by the user. Although there is a limit to a degree of freedom in that it is not possible to independently set the parameter values of two or more change-target parameters individually, it is possible for the user to easily set the parameter values meeting an image scene to be captured and the user's preference in consideration of the relative advantages and the balance of the two or more adjustment parameters without repeating the operation of selecting the adjustment parameters whose parameter values are to be changed.

In this regard, there is an imaging apparatus having a scene-selection function which automatically sets the individual adjustment parameters to the parameter values recorded in the control section such that the parameter values of the individual adjustment parameters suited to some specific scenes (scenes of images to be captured) are recorded in the control section of the imaging apparatus in advance, and the parameter values are set suitable for the image scene to be captured, which is automatically determined by the imaging apparatus or which is selected by the user.

For example, Japanese Unexamined Patent Application Publication No. 2004-235956 contains a description of an imaging apparatus in which a backlight state of an image is determined, and backlight correction is performed in accordance with the backlight state.

In an imaging apparatus having a scene-selection function, the user is allowed to capture an image with the parameter values suited to an scene of an image to be captured without having to perform troublesome operation by activating the scene-selection function.

However, in an imaging apparatus having a scene-selection function, individual adjustment parameters are uniquely set to the parameter values recorded in the control section in advance, and thus user does not have a degree of freedom in setting parameter values. Thereby the imaging apparatus sometimes causes the user to capture an image not meeting the user's preference.

In contrast, in the imaging apparatus in FIG. 1, although there is a limit in that the parameter values of the two or more change-target parameters are simultaneously changed in accordance with the parameter characteristics, the parameter values of the two or more change-target parameters are set (changed) in response to the operation of the specific operation section 31. Accordingly, the user is allowed to capture an image meeting the user's preference more than the case where all the adjustment parameters are uniquely set to the parameter values recorded in the control section in association with an image scene in an imaging apparatus having a scene-selection function.

In this regard, in the imaging apparatus in FIG. 1, it is possible to set parameter characteristics used for setting parameter values in response to the operation of the specific operation section 31 in accordance with the user's operation.

That is to say, in the imaging apparatus in FIG. 1, for example, it is possible to display the graphs as shown in FIG. 9 as the parameter characteristics used for setting the parameter values in response to the operation of the specific operation section 31 on the image display section 11, and to change the parameter characteristics in response to the user's operation (touch) on the graphs displayed on the image display section 11.

In this case, the parameter characteristics after the change are stored in the memory 22 of the system controller 6, and the parameter values of the change-target parameter are set in accordance with the parameter characteristics after the change.

Also, in the imaging apparatus in FIG. 1, it is possible to store a plurality of parameter characteristics in the memory 22 for each one or more change-target parameters related to an image scene, and to select the parameter characteristic used for setting the parameter value in response to the operation of the specific operation section 31 from a plurality of parameter characteristics stored in the memory 22 in response to the user's operation.

For example, in the imaging apparatus in FIG. 1, it is possible to provide a parameter-characteristic selection menu, which is a menu for selecting parameter characteristics on a setting screen for performing various settings. And if the user makes a selection on the parameter-characteristic selection menu, it is possible to display graphs as a plurality of parameter characteristics for each one or more change-target parameters related to an image scene on the image display section 11.

And in the imaging apparatus in FIG. 1, if the user selects one parameter characteristic among a plurality of parameter characteristics displayed on the image display section 11, it is possible to select the parameter characteristic as a parameter characteristic used for setting the parameter values in response to the operation of the specific operation section 31.

As described above, if it is possible to set the parameter characteristic to be used for setting a parameter value in response to the operation of the specific operation section 31 in response to the user's operation, it is possible to relieve the restriction on the degree of freedom that the parameter values of the two or more change-target parameters are not allowed to independently be set individually.

In this regard, it is also possible to allow the selection of the adjustment parameters related to each default scene as the change-target parameters in the change-target parameter table in the same manner as the parameter characteristics in the parameter-characteristic selection menu in response to the user's operation.

Also, in FIG. 7, as an initial value of the change-target parameter assigned to the specific operation section 31 having an operation value in a range between −A and +A, the parameter value in the case where the operation value is 0 in the parameter characteristic is employed. However, in addition, for example, it is possible to learn the operation of the specific operation section 31 by the user as operation learning in which the parameter values meeting the user's preference is learned, and the initial values of the parameter values of the change-target parameters assigned to the specific operation section 31 are set on the basis of the result of the operation learning.

For example, it is possible for the system controller 6 to store the parameter values of the change-target parameters set at shooting time in the past in response to the operation of the specific operation section 31 by the user for each recognition scene in the memory 22 as operation learning.

And it is possible for the system controller 6 to set the initial values of the change-target parameters assigned to the specific operation section 31 on the basis of the parameter values stored in the memory 22 in the operation learning.

That is to say, for example, for the change-target parameters related to a certain default scene, it is possible to employ, as initial values of the parameter values, graphic values as the parameter characteristics nearest to the average value or the mode of the parameter values of the image of the recognition scene matching the default scene, which were set at shooting time of the past several times, or the parameter values set at previous shooting time, etc.

Also, for example, it is possible for the system controller 6 to store the parameter values of the change-target parameters set in the past in association with the operation of the specific operation section 31 by the user and the shooting environment of capturing the image when the parameter value is set into the memory 22 for each recognition scene as operation learning.

And it is possible for the system controller 6 to set the initial values of the parameter values of the change-target parameters assigned to the specific operation section 31 on the basis of the parameter values related to the shooting environment (including similar shooting environments) matching the shooting environment of the current image out of the parameter values of the recognition scenes stored in the memory 22 in the operation learning.

That is to say, for example, a shooting environment at shooting time, such as a rate of backlight and brightness, etc., and a parameter value of the change-target parameter set at the shooting time are stored in the memory 22 in association with each other. And it is possible for the system controller 6 to employ, as the initial value of the parameter value, the graphic value as the nearest parameter characteristic to the parameter value, etc., stored in association with the shooting environment matching the current shooting environment.

Alternatively, the system controller 6 obtains a predetermined function, such as a polynomial, indicating a relationship between the shooting environment at shooting time and the parameter values of the change-target parameters set at the shooting time. And the system controller 6 calculates the parameter value as the function value for the current shooting environment using the function, and can employ the graphic value as the nearest parameter characteristic to the parameter value as the initial value of the parameter value.

As described above, operation learning in which the operation of the specific operation section 31 by the user is learned is carried out, and the initial values of the parameter values of the change-target parameters assigned to the specific operation section 31 is set on the basis of the result of the operation learning. Thereby, the user is allowed to capture an image meeting the user's preference without (virtually) performing operation of the specific operation section 31.

Also, in the present embodiment, the specific operation section 31 serves to function only as an operation section setting parameter values of the change-target parameters. However, the specific operation section 31 can further function as an operation section having a certain default function.

In this case, the system controller 6 can set parameter values of the change-target parameters in response to the operation of the specific operation section 31 only at the time when the specific operation section 31 is operated simultaneously with a predetermined operation section (for example, an operation section functioning as a shutter button, etc.,) among the operation sections of the operation section group 13. That is to say, the system controller 6 can make the specific operation section 31 function as the operation section setting the parameter values of the change-target parameters.

By doing as described above, if the specific operation section 31 is operated separately, the specific operation section 31 is made to function as an operation section having a certain default function, whereas if the specific operation section 31 is operated simultaneously with a predetermined operation section, the specific operation section 31 can be made to function as an operation section setting the parameter values of the change-target parameters.

Also, the image display section 11 is allowed to display an image corresponding to the current parameter value of the change-target parameter, and if operated such that the operation value of the specific operation section 31 becomes a predetermined value, the image display section 11 is allowed to display an image corresponding to the parameter value of the change-target parameter set by the system controller 6.

That is to say, the system controller 6 sets one or more tentative operation values in a range from −A to +A, in which the specific operation section 31 can have an operation value.

One or more tentative operation values can be set, for example, such that all the operation values including one or more of the tentative operation values of and the current operation value of the specific operation section 31 are placed preferably at regular intervals in the range between −A and +A. For example, if the current operation value of the specific operation section 31 is 0, when two tentative operation values are set, the two tentative operation values can be set, for example, as −A/2 and +A/2, respectively.

And the imaging apparatus performs adjustment processing, such as the exposure control, the white balance adjustment, the grayscale control, the color adjustment, etc., by time division, etc., in accordance with individual tentative parameter values corresponding to one or more tentative operation values and the individual current parameter values corresponding to the current operation values, obtains the individual images corresponding to one or more tentative parameter values and the image corresponding to the current parameter value, and displays the images on the image display section 11 at the same time.

In this case, the user can check an image (image corresponding to the tentative parameter value corresponding to the tentative operation value) to be captured if the specific operation section 31 is operated to have the tentative operation value before operating the specific operation section 31 in addition to the image corresponding to the current parameter value.

In this regard, as described above, if the user displays the image corresponding to the tentative parameter value together with the image corresponding to the current parameter value on the image display section 11, when the user selects (touches) the image corresponding to the tentative parameter value displayed on the image display section 11, the system controller 6 can set the change-target parameter to the tentative parameter value of the image that the user has selected.

In this case, the user can set the change-target parameters so as to capture an image of the user's preference by just selecting an image displayed on the image display section 11 without changing the operation value (and thus parameter value) by operating the specific operation section 31.

In this regard, the setting of the change-target parameters (whose parameter values) by operating the specific operation section 31 may be carried out before capturing an image (still image and moving image) or may be carried out during capturing an image (moving image).

Also, in addition to performing adjustment processing, such as the exposure control, the white balance adjustment, the grayscale control, the color adjustment, etc., in accordance with the change-target parameters on an image before shooting, that is to say, an image before being recorded on a recording medium by the image storage section 12, it is possible to perform the adjustment processing on an image after the image is recorded on an recording medium, and when the image is played back from the recording medium.

The description has been given of the case where the present invention is applied to an imaging apparatus having a function of capturing an image (still image or moving image). However, the present invention can also be applied to an image processing apparatus not having a function of capturing an image. That is to say, the present invention can also applied to, for example, application software, etc., which edits images captured by a digital camera, etc.

Description of Computer to which the Present Invention is Applied

Next, the above-described series of processing can be executed by hardware or can be executed by software. When the series of processing is executed by software, programs of the software may be installed in a general-purpose computer, etc.

Thus, FIG. 10 illustrates an example of a configuration of a computer, according to an embodiment, to which programs executing the above-described series of processing are installed.

The programs can be recorded in the hard disk 105 and the ROM 103, which are included in the computer as recording media, in advance.

Alternatively, the programs can be stored (recorded) in a removable recording medium 111. Such a removable recording medium 111 can be provided as a so-called package software. Here, the removable recording medium 111 includes, for example, a flexible disk, a CD-ROM (Compact Disc Read Only Memory), an MO (Magneto Optical) disc, a DVD (Digital Versatile Disc), a magnetic disk, a semiconductor memory, etc.

In this regard, the programs can be downloaded through a communication network or a broadcasting network, and can be installed into an internal hard disk 105 in addition to being installed from the removable recording medium 111 described above. That is to say, the programs can be transferred from, for example a download site to the computer through an artificial satellite for digital satellite broadcasting by wireless communication, or can be transferred to the computer through a network, such as a LAN (Local Area Network) and the Internet by wired communication.

The computer includes a CPU (Central Processing Unit) 102, and an input/output interface 110 is connected to the CPU 102 through the bus 101.

When an instruction is input by the user operating the input section 107, etc., through the input/output interface 110, the CPU 102 performs the programs stored in the ROM (Read Only Memory) 103 accordingly. Alternatively, the CPU 102 loads the programs stored in the hard disk 105 into the RAM (Random Access Memory) 104 to execute the programs.

Thereby, the CPU 102 performs processing in accordance with the above-described flowchart, or processing by the configuration of the above-described block diagram. And the CPU 102 outputs the processing result, for example from the output section 106 through the input/output interface 110 as necessary, or transmits the processing result from the communication section 108, or further, records the processing result into the hard disk 105, etc.

In this regard, the input section 107 includes a keyboard, a mouse, a microphone, etc. Also, the output section 106 includes an LCD (Liquid Crystal Display), a speaker, etc.

Here, in the present specification, the processing performed by the computer in accordance with the programs is not necessarily executed in time series in accordance with the described sequence as the flowchart. That is to say, the processing performed by the computer in accordance with the programs includes processing to be executed in parallel or individually (for example, parallel processing or object processing).

Also, the programs may be performed on one computer (processor), or may be distributedly performed by a plurality of computers. Further, the programs may be transferred to a remote computer to be executed there.

The present application contains subject matter related to that disclosed in Japanese Priority Patent Application JP 2009-270070 filed in the Japan Patent Office on Nov. 27, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus configured to operate in a semi-manual parameter setting mode and a full-manual parameter setting mode, comprising:
    scene recognition circuitry to recognize a scene associated with a captured image;
    assigning circuitry to select a change-target parameter, which is an adjustment parameter whose parameter value is to be changed, from a plurality of adjustment parameters that adjust the captured image, in response to the recognized scene, and to assign control of the selected change-target parameter to a specific user-operable operation section of a plurality of user-operable operation sections, the specific user-operable operation section being configured to be operated by a user to manually set the selected change-target parameter when the image processing apparatus is in the semi-manual parameter setting mode; and
    parameter setting circuitry to set a parameter value of the selected change-target parameter assigned to the specific user-operable operation section in response to operation of the specific user-operable operation section by the user to manually set the selected change-target parameter when the image processing apparatus is in the semi-manual parameter setting mode, and to automatically set all remaining adjustment parameters not selected by the assigning circuitry,
    wherein, when the image processing apparatus is in the semi-manual parameter setting mode:
    the assigning circuitry selects the change-target parameter and assigns control of the selected change-target parameter,
    the parameter setting circuitry sets the parameter value of the selected change-target parameter in response to the user operation of the specific user-operable operation section to manually set the selected change-target parameter, and
    the parameter setting circuitry automatically sets all remaining adjustment parameters not selected by the assigning circuitry.

2. The image processing apparatus according to claim 1, wherein the assigning circuitry selects two or more adjustment parameters as the change-target parameters from the plurality of adjustment parameters in response to the recognized scene, and assigns control of the selected change-target parameters to the specific user-operable operation section; and
    the parameter setting circuitry simultaneously sets parameter values of the two or more change-target parameters assigned to the specific user-operable operation section in response to operation of the specific user-operable operation section by the user.

3. The image processing apparatus according to claim 1, wherein the scene recognition circuitry determines and recognizes the scene from the image.

4. The image processing apparatus according to claim 1, wherein each recognizable scene and a related adjustment parameter to be selected as the change-target parameter in response to the recognized scene are stored in association with each other, and
    the assigning circuitry selects the adjustment parameter related to the scene recognized by the scene recognition circuitry as the selected change-target parameter.

5. The image processing apparatus according to claim 1, wherein a parameter characteristic indicating a relationship between an operation value of the specific user-operable operation section and a parameter value of a selectable change-target parameter is stored in association with each recognizable scene, and
    the parameter setting circuitry sets a parameter value of the selected change-target parameter based on the parameter characteristic related to the scene recognized by the scene recognition circuitry in response to operation of the specific user-operable operation section.

6. The image processing apparatus according to claim 5, wherein the parameter characteristic used to set the parameter value in response to operation of the specific user-operable operation section is set in response to the user's operation of the user-operable operation section.

7. The image processing apparatus according to claim 6, wherein the parameter characteristic used to set the parameter value in response to operation of the specific user-operable operation section is set by being changed in response to the user's operation of the user-operable operation section.

8. The image processing apparatus according to claim 6, wherein a plurality of parameter characteristics are stored for one of the selectable change-target parameters, and
    the parameter characteristic used to set the parameter value in response to operation of the specific user-operable operation section is selected from the plurality of parameter characteristics in response to the user's operation of the user-operable operation section.

9. The image processing apparatus according to claim 1, wherein the user learns operation of the specific user-operable operation section according to operation learning, and an initial value of a parameter value of the selected change-target parameter assigned to the specific user-operable operation section is set based on of a result of the operation learning.

10. The image processing apparatus according to claim 9, wherein a parameter value of a previously set change-target parameter set in response to user operation of the specific user-operable operation section is stored as the operation learning, and the initial value of the parameter value of the selected change-target parameter assigned to the specific user-operable operation section is set based on the parameter value stored as the operation learning.

11. The image processing apparatus according to claim 9, wherein a parameter value of a previously set change-target parameter set in response to user operation of the specific user-operable operation section stored as the operation learning and a shooting environment for shooting the image when the parameter value is set are stored in association with each other as the operation learning, and an initial value of the parameter value of the selected change-target parameter assigned to the specific user-operable operation section is set based on the parameter value related to a shooting environment matching a shooting environment of the image.

12. The image processing apparatus according to claim 1, wherein, when the specific user-operable operation section is operated simultaneously with a predetermined operation section of the specific user-operable operation section, the parameter setting circuitry sets a parameter value of the selected change-target parameter assigned to the specific user-operable operation section in response to operation of the specific user-operable operation section.

13. The image processing apparatus according to claim 1, further comprising display circuitry to display an image corresponding to a current parameter value of the selected change-target parameter, and an image corresponding to the parameter value set by the parameter setting circuitry when operated so that an operation value of the specific user-operable operation section becomes a predetermined value.

14. The image processing apparatus according to claim 13, wherein, when the image displayed by the display circuitry is selected by the user, the parameter setting circuitry sets the parameter value of the selected change-target parameter to the parameter value of the image selected by the user.

15. The image processing apparatus according to claim 1, further comprising image capturing circuitry to capture an image.

16. The image processing apparatus according to claim 1, wherein the specific user-operable operation section is a physical operation dial, an operation lever, an operation ring, a touch button displayed on a touch panel, or a touch slide bar.

17. A method of processing an image in a semi-manual parameter setting mode, comprising:
recognizing, via scene recognition circuitry, a scene associated with a captured image;
selecting, via selecting circuitry, a change-target parameter, which is an adjustment parameter whose parameter value is to be changed, from a plurality of adjustment parameters that adjust the captured image, in response to said recognizing the scene;
assigning control of, via assigning circuitry, the selected change-target parameter to a specific user-operable operation section of a plurality of user-operable operation sections, the specific user-operable operation section being configured to be operated by a user to manually set the selected change-target parameter when in the semi-manual parameter setting mode;
setting, via setting circuitry, a parameter value of the selected change-target parameter assigned to the specific user-operable operation section in response to operation of the specific user-operable operation section by the user to manually set the selected change-target parameter when in the semi-manual parameter setting mode; and
automatically setting, via the setting circuitry, all adjustment parameters of said plurality not selected by the selecting circuitry,
wherein said selecting the change-target parameter, said assigning control of the selected change-target parameter, said setting the parameter value of the selected change-target parameter, and said automatically setting are performed in the semi-manual parameter setting mode.

18. A non-transitory computer-readable recording medium having recorded thereon a program that, when executed by a computer, causes the computer to perform a method of processing an image in a semi-manual parameter setting mode comprising:
recognizing a scene associated with a captured image;
selecting a change-target parameter, which is an adjustment parameter whose parameter value is to be changed, from a plurality of adjustment parameters that adjust the captured image, in response to said recognizing the scene;
assigning control of the selected change-target parameter to a specific user-operable operation section of a plurality of user-operable operation sections, the specific user-operable operation section being configured to be operated by a user to manually set the selected change-target parameter when in the semi-manual parameter setting mode;
setting a parameter value of the selected change-target parameter assigned to the specific user-operable operation section in response to operation of the specific user-operable operation section by the user to manually set the selected change-target parameter when in the semi-manual parameter setting mode; and
automatically setting any non-selected adjustment parameters of said plurality,
wherein said selecting the change-target parameter, said assigning control of the selected change-target parameter, said setting the parameter value of the selected change-target parameter, and said automatically setting are performed in the semi-manual parameter setting mode.

19. An image processing apparatus configured to operate in a semi-manual parameter setting mode and a full-manual parameter setting mode, the apparatus comprising:
a specific user-operable operation section configured to be operated by a user;
scene recognition circuitry to recognize a scene associated with a captured image;
assigning circuitry to select a change-target parameter, which is an adjustment parameter whose parameter value is to be changed, from a plurality of adjustment parameters that adjust the captured image, in response to the recognized scene associated with the captured image, and to assign control of the selected change-target parameter to the specific user-operable operation section of a plurality of user-operable operation sections, the specific user-operable operation section being configured to be operated by the user to manually set the selected change-target parameter when the image processing apparatus is in the semi-manual parameter setting mode; and
parameter setting circuitry to set a parameter value of the selected change-target parameter assigned to the specific user-operable operation section in response to operation of the specific user-operable operation section by the user to manually set the selected change-target parameter when the image processing apparatus is in the semi-manual parameter setting mode, and to automatically set any remaining adjustment parameters not selected by the assigning circuitry,
wherein, when the image processing apparatus is in the semi-manual parameter setting mode:
the assigning circuitry selects the change-target parameter and assigns control of the selected change-target parameter, the parameter setting circuitry sets the parameter value of the selected change-target parameter in response to the user operation of the specific user-operable operation section to manually set the selected change-target parameter, and the parameter setting circuitry automatically sets any remaining adjustment parameters not selected by the assigning circuitry.

20. The image processing apparatus according to claim 1, wherein, in the full-manual setting mode, the parameter setting circuitry sets all of said adjustment parameters based on the user's operation of corresponding ones of said user-operable operation sections.

* * * * *